Inventor
Dieter Voegtlen
By [signature]
Att'y.

Inventor
Dieter Voegtlen
By
Att'y.

Inventor
Dieter Voegtlen
By
Att'y.

CIRCUIT AMBIGUITY TESTING SYSTEM

Filed Jan. 7, 1958 4 Sheets-Sheet 4

Inventor
Dieter Voegtlen
By [signature]
Atty.

United States Patent Office 2,997,646

Patented Aug. 22, 1961

2,997,646

CIRCUIT AMBIGUITY TESTING SYSTEM

Dieter Voegtlen, Munich, Germany, assignor to Siemens and Halske Aktiengesellschaft Berlin and Munich, a corporation of Germany Filed Jan. 7, 1958, Ser. No. 707,593
Claims priority, application Germany Jan. 30, 1957
14 Claims. (Cl. 324—28)

This invention is concerned with a circuit ambiguity testing system and apparatus.

Signalling systems, for example, telephone and other communication systems contain equipment comprising a great number of relays or equivalent switching elements of which only one must at any time be in actuated position so as to secure proper operation. The requirement is, accordingly, that only one of the control potential sources must at any time deliver feed potential. Several such groups of relays may be provided for a given equipment part, which must meet this requirement. Similarly, there may be in a given system several equipment parts calling for the indicated condition, for example, markers. The proper operation of such groups of relays may be in known manner supervised by ascertaining, by means of a testing device, whether there is at any time more than one relay in actuated position, that is, energized, or, putting it in other words, whether there is feed potential at more than one of the corresponding potential sources. If such is the case, an indicating device will be actuated. The corresponding testing device is referred to as an "ambiguity tester."

As taught by experience, such an ambiguity tester, to operate sufficiently reliably, must meet diverse requirements. Thus, it should be immune to trouble; the relays to be supervised should require none or only few auxiliary contacts serving the purpose of supervision; no particular or exacting requirements should be posed for the switching elements of the ambiguity tester; etc., etc. Finally, the required expenditure so far as switching elements, etc., is concerned, should be low.

Some ambiguity testers are circuited so that the supervision is effected by means of contact pyramids formed by contacts which are controlled by the relays to be supervised. The disadvantage of such an arrangement, if a considerable number of relays is to be supervised, resides in the fact that each such relay must be provided with several auxiliary contacts. Other ambiguity testers employ relays supplied for intervals with current insufficient to effect operative actuation thereof, thus disadvantageously calling for particular tolerance requirements for actuation responsive to receiving actuating current.

The various objects and features of the invention will be brought out in the description which will be rendered below with reference to the accompanying drawings, in which FIG. 1 shows the circuit of a known ambiguity tester for five relays to be supervised, to demonstrate shortcomings thereof;

FIG. 2*a* presents a scheme illustrating the principles underlying the invention;

FIG. 2*b* represents a circuit embodiment utilizing the scheme shown in FIG. 2*a*;

Figure 1:
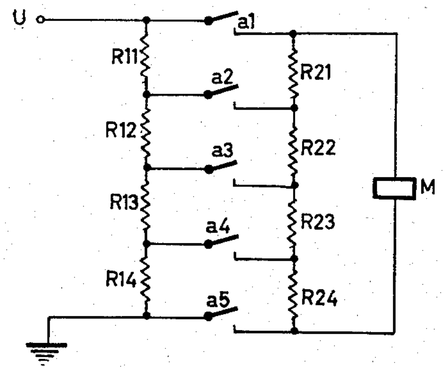

The circuit shown in FIG. 1 represents an ambiguity tester in which the potential difference occurring between two contacts, controlled by the relays to be supervised, is evaluated so as to cause energization of an indicating element. Each of five relays to be supervised controls a make contact indicated at *a*1 to *a*5. These contacts are connected at points between two parallel disposed serially extending resistors R11 to R14 and R21 to R24, respectively. The series circuit of resistors R11 to R14 is supplied from a direct current source U; the series circuit of resistors R21 to R24 is connected to an indicating relay M. Closure of only one contact such as *a*1 to *a*5 will not cause current flow through the winding of relay M since both its terminals are in such case on the same potential. However, if two of the contacts are closed, for example, contacts *a*1 and *a*2, there will be at one terminal of relay M by way of contact *a*1 the potential U and at the other terminal thereof, by way of the resistors R24, R23, R22 a lower potential, thus producing due to the voltage difference at the relay terminals current flow through the relay winding and consequently energization of the relay. The effective voltage difference is in the assumed case smaller than ¼ of the total voltage U, due to subdivision of the total voltage at the series circuit of the resistors. In case of closure, for example, of contacts *a*1 and *a*5, the relay M will receive the full voltage. Accordingly, in the supervision of five relays, the voltage on the indicating element will fluctuate by a value more than fourfold, from about ¼U to U. More than two contacts may be simultaneously actuated by the relays to be supervised. The voltage at the indicating relay will then be determined predominently by the contacts lying in the circuit farthest apart.

This circuit has several disadvantages. Current flows over the resistors R11 to R14 even in normal condition of the circuit, representing loss current which is of the same order of magnitude as the current flowing during operative actuation. The voltage at the indicating relay fluctuates considerably, which is of great disadvantage. The fluctuation will increase with the number of relays to be supervised and the circuit is accordingly only adapted for the supervision of a small number of relays.

The system according to the invention, for supervising circuit or switching elements, employs different switching means and different switching principles, thereby avoiding the drawbacks of the above explained circuits. The ambiguity tester according to the invention employs for the supervision of circuit elements potential sources appearing at circuit points or switching points or terminals, which may be respectively designated as normal or resting potentials and working potentials; the resting potentials indicating the normal condition and the working potentials indicating the working or operated condition of the corresponding potential sources and therewith the normal or operating condition of hte switching or circuit elements belonging to the respective switching points. The switching points acting in this manner as potential sources may be represented, for example, by terminals of relay contacts, thus permitting supervision of the switching conditions of the corresponding relays. In order to realize the desired supervision as to ambiguity, it must be assumed that the resting or normal potentials are among one another substantially similar and likewise that the working potentials are among one another substantially similar; however, sufficiently great potential differences must obtain between the resting potentials and the working potentials.

The polarity which the working potentials and the resting potentials may at any time have is immaterial so far as the principle is concerned. The polarity also depends upon the given reference point.

Figure 2A:
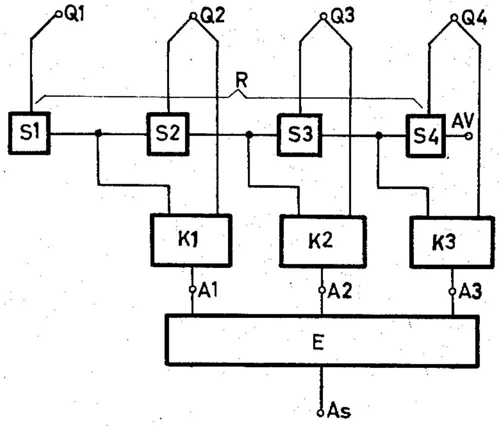
Figure 2B:
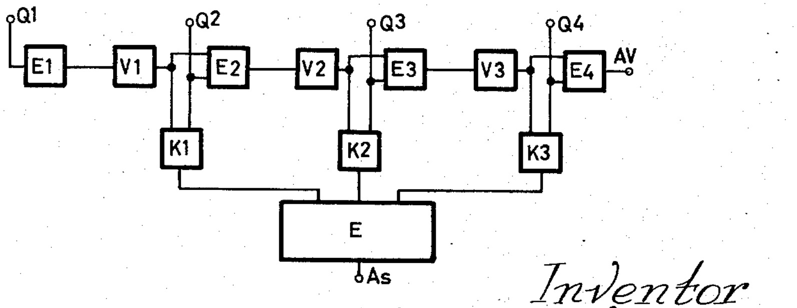
Figure 7:
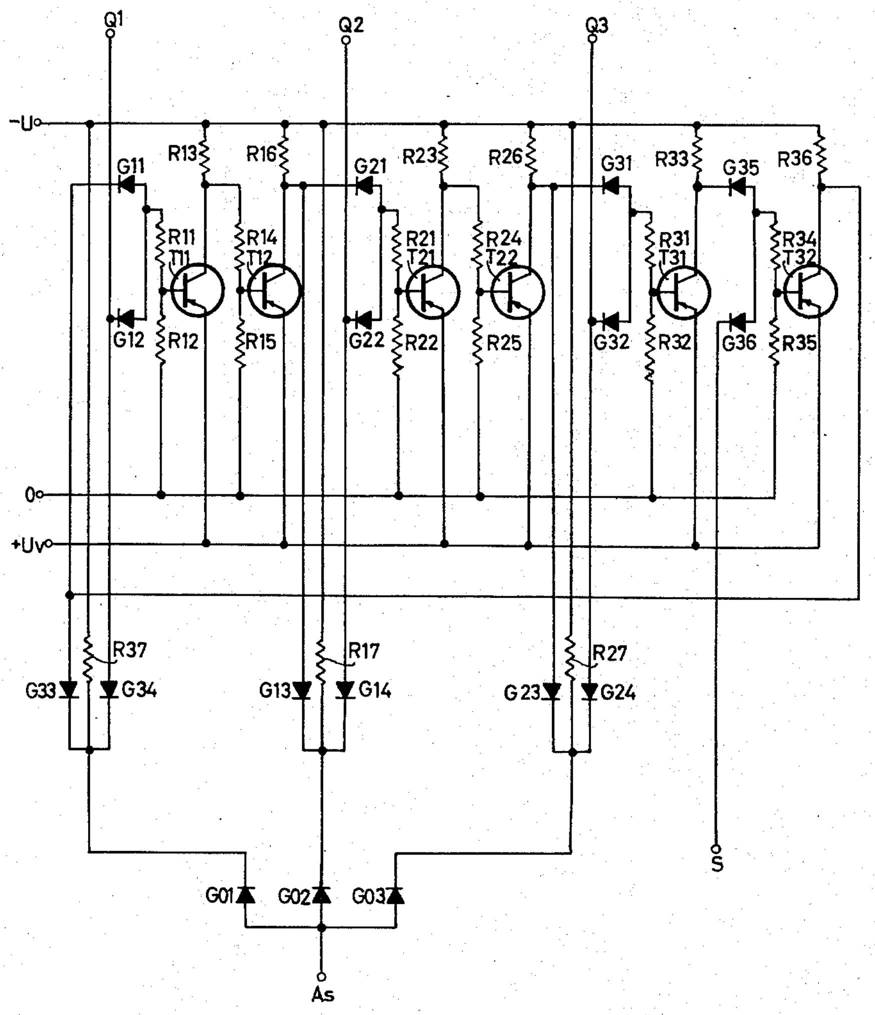
FIG. 7 shows a further embodiment of a circuit ambiguity tester.

FIGS. 2*a*, 2*b* and 7 show in schematic manner circuit arrangements in which it is assumed that a certain predetermined working potential appears in working condition at the potential sources as switching potential. The switching elements used in these cases are such as to produce a particular effect upon extension of a working potential, the switching elements including among others the elements K1, K2 and K3 represented by coincidence circuits (And-circuit). Each is provided with two inputs and one output and adapted to, produce a signal at the output, for example, in the form of a predetermined voltage, responsive to the simultaneous presence of the above noted working potential at both of its inputs. These coincidence circuits will hereinafter be referred to as two-place coincidence circuits. The inputs of a coincidence circuit (And-circuit) which are supplied with potentials so as to produce the signal at the output may also be designated as activated inputs and this term will hereinafter be applied.

Figure 3:
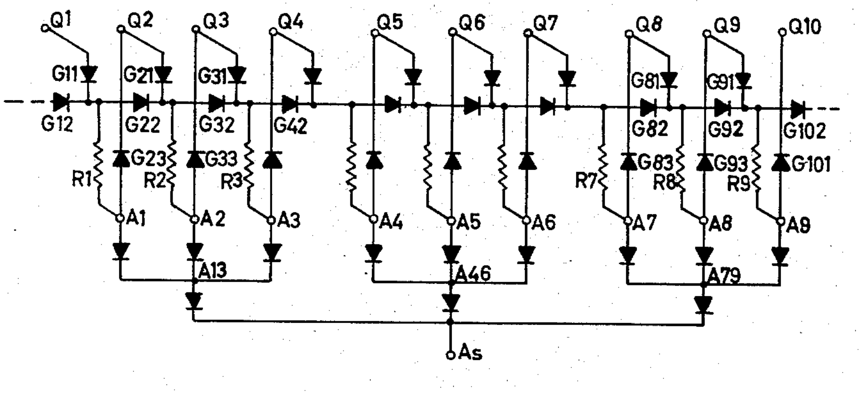
FIG. 3 illustrates details in connection with the scheme shown in FIG. 2*a*.
Figure 5:
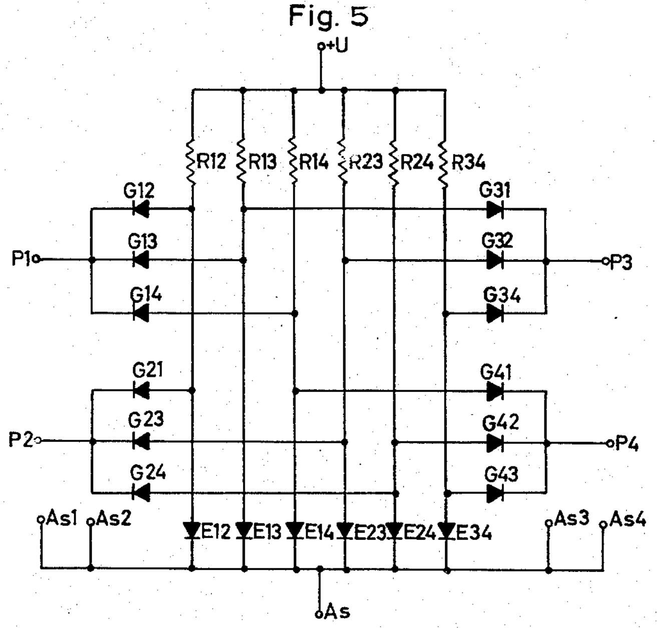
FIG. 5 represents a network for a plurality of ambiguity testers.

FIGS. 3, 5 and 8 show switching or circuit arrangements more in detail wherein working potentials and resting potentials are operative the polarity of which will be stated. Thus, in the circuit according to FIG. 3, the working potential is positive and the resting or normal potential is negative. In the circuit according to FIG. 5, the resting potential corresponds to ground potential and the working potential is positive as against ground. In the circuit according to FIG. 8, the working potential is negative and the resting potential is positive.

The ambiguity tester according to the invention produces a signal when several potential sources of a plurality of functionally related $n$ potential sources exhibit at the same time a predetermined switching potential. The ambiguity tester is provided with $n-1$ indicating points or terminals formed respectively by the output of a two-place coincidence circuit one input of which is on one of the potential sources 2 to $n$ and the other input at a tap of a series circuit of similarly constructed switching elements, each switching element belonging to a potential source, the delivery of working potential being controlled by the respectively associated potential source in such manner that the other inputs of the coincidence circuits allocated to the successive sources in the series, are activated, thereby causing appearance of an indicating or signalling potential at the indicating point belonging to a directly connected potential source which also delivers working potential.

FIG. 2*a* is intended to aid in explaining the inventive thoughts. It is assumed that there are four sources Q1 to Q4 and, accordingly, three indicating points A1 to A3. Each source controls a switching element allotted thereto, such element being indicated at S1 to S4 and connected in the series circuit R. This series circuit may comprise $n$ switching elements, in the assumed case, four identical elements. The source Q1 is the first in the series. The succeeding sources are additionally connected, each with one input of a two-place coincidence circuit K1 to K3. The other inputs of the coincidence circuits are activated over the series circuit R responsive to delivery of a working potential by a preceding source in the series. Accordingly, assuming working potential to be present at least at any two of the sources, one source preceding the other in the series, and activating the one input of the coincidence circuit allotted to the other source. At the other input of this coincidence circuit is the other source, and such coincidence circuit will therefore be activated at both inputs and will deliver an indicating potential at its output, operating as an indicating point.

The several indicating points A1 to A3 may be connected with a common indicating point or terminal A*s* by way of an output mixing gate E which may be constructed in known manner by means of decoupling rectifiers. The rectifier in the connection from the indicating point such as A1, A2, A3 to the common indicating point A*s* will in such case pass current and the other rectifiers will be blocked.

In the case of very many indicating points, the indicating potential conducted to the common indicating point may be affected detrimentally due to leakage over the parallel connected blocking resistors of the corresponding rectifiers. It will be in such case advisable to arrange the decoupling rectifiers in staggered series circuit, as shown in FIG. 3, wherein the staggered circuit is disposed between the indicating points A1 to A9 and the common indicating point A*s*. The nine indicating points assumed to be provided are disposed in three identical groups which operate respectively over terminals A13, A46 and A79, these terminals in turn operating with respect to the common indicating point or terminal A*s*. The corresponding circuit contributes toward considerably improving the conditions between the resultant leakage resistance for an indicating potential operative at the common indicating point due to the blocking resistance of the rectifiers operating in blocking direction, and the resultant line resistance due to the rectifiers operating in pass direction.

FIG. 2*b* shows a circuit including further features in a particular embodiment of the principles according to FIG. 2*a*. The series circuit comprises switching elements E1, E2, E3 and E4. As a further feature, there is provided an amplifier between neighboring switching elements, as indicated respectively at V1, V2 and V3. The function of the rectifiers is to equalize voltage drops occurring at the switching elements along the series circuit, thereby securing reliable operation. These amplifiers must operate so as to deliver at their outputs voltage changes occurring at the inputs thereof amplified but in a sense corresponding to the input voltages, that is, there must not be any directional reversal. The amplifiers may in each case comprise, for example, two serially connected transistor amplifier stages as shown in FIG. 8, which will be presently described in detail. It may, however, be mentioned at this point that the example according to FIG. 8 comprises a first element having rectifiers G11 and G12 and a second element having rectifiers G21 and G22. Between these two switching elements are connected two transistor amplifier stages comprising transistors T11 and T12.

As switching elements for the series circuit there may generally be used mixing gates with two inputs and one output, with the corresponding potential source connected in each instance to one input and the output of the preceding mixing gate connected with the other input. FIG. 2*b* shows the use of such mixing gates as switching elements. It is, of course, understood that it is not absolutely necessary to use also the amplifiers shown in FIG. 2*b*. The requirement to be met in the use of mixing gates as switching elements likewise is that they deliver a working potential reecived at one input thereof to one input of the successive coincidence circuit in the series. For example, if the source Q2 delivers a working potential, one input of the mixing gate E2 will be activated, and working potential will be delivered at its output which is effective to activate one input of the coincidence circuit K2 and one input of the next successive mixing gate E3, etc. Since the inputs of a mixing gate are mutually decoupled, the source Q3, which is connected to the other input of the mixing gate E3, will not be affected. The circuit operates so far as the principle is concerned just as the circuit shown in FIG. 2*a*.

Therefore, if in addition to the potential source Q2, another potential source should have working potential, a signal will be produced at the output A*s*. If such other potential source is, for example, the potential source Q3, the second input of the two-place coincidence circuit K2 will also be activated and such circuit will deliver at its output a voltage which is extended by way of the mixing gate E to appear at the output A*s* as a signal for the indication of ambiguity, such ambiguity being present due to the fact that working potential is at more than one potential source, in the assumed case, at two potential sources.

In FIG. 7, there are provided two-place coincidence circuits with fixed auxiliary voltage and use of two rectifiers and a resistor, which have been found particularly suitable for the corresponding arrangement. For example, the coincidence circuit, belonging to the source Q2 and to the preceding mixing gate, comprises the resistor R17 and the rectifiers G13 and G14; the indicating voltage being conducted to the decoupling rectifier connected therewith. The operation of this coincidence circuit is such that the indicating voltage, negative in this case, is delivered from an auxiliary voltage source —U by way of the resistor R17 and is conducted over at least one of the rectifiers G13 or G14, if the source Q2 does not deliver working potential (which must likewise be negative) or if none of the preceding sources in the series (in the assumed case, source Q1) delivers a negative working potential. It is understood, of course, that differently constructed suitable coincidence circuits may be used if desired.

FIG. 3 shows an embodiment of an ambiguity tester according to the invention. Sources Q1 to Q10 are assumed to be present. The switching elements of the series circuit are assumed to be rectifiers G12 to G102. At each tap of the series circuit there is connected the source, over a decoupling rectifier such as G11 to G91 which is adapted to pass the working potential thereof, which precedes the source in the series the coincidence circuit of which is connected to the same tap; for example, the coincidence circuit with the indicating terminal A2 and comprising the resistor R2 and the rectifier G33, belongs to the source Q3, such source being directly connected to one input of the corresponding coincidence circuit. The preceding source Q2 is, accordingly, connected over the decoupling rectifier G21, with the tap of the series circuit to which is connected the other input of the coincidence circuit.

Each coincidence circuit comprises in this embodiment a rectifier and a resistor. Other suitable coincidence circuits may, however, be used. The rectifiers G12 to G102 of the series circuit are polarized so that the working potentials supplied can be propagated only in a direction toward the end of the series circuit. The first and the last rectifier, namely, G12 and G102, are shown connected to the circuit only with one terminal and, therefore, may be omitted. They have been included in order to bring out the principles underlying construction of the circuit.

The operation of the circuit may be explained by a functional example. It shall be assumed that the sources Q3 and Q9 deliver working potential which is positive. The remaining sources carry normal potential which is negative. The positive potential from the source Q3 is extended over the rectifier G31 to the tap of the series circuits connected thereto and becomes effective at the successive taps of the series circuit over the rectifiers G42 and G92 and further, over the resistor R8 which is connected at a point between the rectifiers G82 and G92, at the indicating point A8. The positive potential coming from the source Q3 and appearing thus at the indicating point A8 does not leak over the rectifier G93 which is connected to the source Q9 since such positive potential is, as has been assumed, also present at the source Q9. The positive potential is therefore retained at the indicating point A8 and operates at such point as indicating potential. The resistor R8 jointly with the rectifier G93 form accordingly a coincidence circuit.

The circuit will operate in the same manner if positive potential, that is, working potential, is simultaneously on more than two sources, except that the indicating potential will appear at more than one indicating point. In the event that positive potential appears only at one source, while negative potential is on all other sources, the indicating potential, namely, positive potential, will not appear at any indicating point. For example, if there is positive potential at the source Q3, such potential will reach the successive taps of the series circuit of the rectifier G32 . . . G102 but will not reach the indicating point A3, since the negative potential on source Q4 becomes operative at the indicating point A3 over the rectifier connected between such source and the indicating point. This rectifier is in this case operative in pass direction, its pass resistance being considerably lower than that of resistor R3. The negative potential at the source Q4 will accordingly dominate at the indicating point A3. Negative potential will for corresponding reasons continue to be effective at the indicating points A4 . . . A9. Accordingly, there will not be indicating potential on any one of the indicating points A3 . . . A9. The indicating points A1 and A2 are likewise without indicating potential since negative potential from the source Q2 is extended to the indicating point A1 over the rectifier G23 and since the positive potential on the source Q3 can not become operative at the indicating point A2 because the rectifier G33, disposed between this source and the indicating point A2, is conductive only for negative potential. The rectifier G32 is likewise polarized so that the positive potential on the source Q3 can not reach the indicating points A1 and A2.

Attention may also be called to the fact that a shunt may be substituted for the decoupling rectifier G11. This may be done since the source Q1 is the first in the series and since the potentials of the succeeding sources cannot become operative rearwardly; accordingly, the potential of the first source cannot be falsified by the other potential sources. The rectifier G11 has been included in FIG. 3 so as to bring out the circuit principles more clearly.

Figure 4:
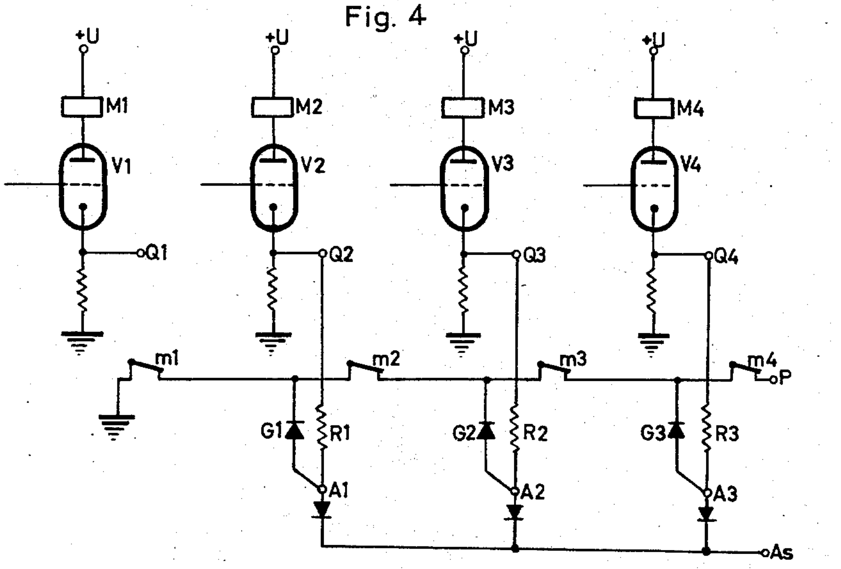
FIG. 4 shows another embodiment of the invention.

FIG. 4 shows another embodiment of the invention. The switching elements of the series circuit are in this case normally closed contacts, commonly referred to as resting contacts or break contacts. These contacts are respectively allotted to the individual sources and are responsive to working potential delivered thereby indirectly opened by the effect of such sources. Between these contacts are disposed taps of the series circuit. Directly connected to one input of each coincidence circuit is again a source, while the other input is connected with a tap which precedes in the series circuit the corresponding break contact. The first of the break contacts in the series circuit is with its free terminal connected with normal potential of the sources which varies with the working potential. Accordingly, the working potentials of the sources effect over contacts controlled by the potentials, in mutually operative decoupling manner, the activation of the inputs of the coincidence circuits belonging to sources (as will be presently brought out) which follow the activating source in the series.

In this example, there are assumed to be four sources Q1 to Q4 and, accordingly, there are provided three coincidence circuits having outputs A1 to A3 which constitute indicating points. Each coincidence circuit comprises a resistor respectively indicated at R1 to R3 and a rectifier respectively indicated at G1 to G3. To each of these resistors is connected one of the sources as indicated at Q2 to Q4. The rectifiers G1 to G3 are correspondingly connected to the taps of the series circuit. The indicating points or terminals A1 to A3 are over decoupling rectifiers operatively effective with respect to the common indicating point or terminal As.

A certain type of potential sources has been assumed in this example of the invention without, however, intending or denoting any particular inherent limitation. Tubes V1 to V4 are provided, to the cathode resistors of which there is normally delivered normal or resting potential at terminals Q1 to Q4 representing the respective sources. In the conductive condition of these tubes, there will be delivered to the corresponding terminals a working potential which is increased by the amount of the voltage drop at the respective cathode resistor. The source potential accordingly depends upon the operating condition of the tubes. The main current of each tube flows advantageously over an associated relay M1 to M4, such relays respectively controlling the contacts *m*1 to *m*4 disposed in the series circuit. The working potential of the source Q1 is effective only over the series circuit by actuation of contact *m*1 and there is, for this reason, no coincidence circuit provided, just as in FIGS. 2 and 3. It will be immediately realized upon considering FIG. 5, that the resting or break contact *m*4 does not affect the circuit, since only one terminal thereof is connected therewith. This contact, therefore, can be omitted; it has been included only for the purpose of clearly indicating the principles involved in the construction of the circuit.

The functions of this circuit shall now be explained in connection with an operating example.

At the sources Q1 . . . Q4 can appear two different potentials depending upon the operating conditions of the tubes V1 . . . V4 and the relays M1 . . . M4. These tubes and these relays belong to the circuit which is being supervised. The invention is not concerned with the circuit which is to be supervised, but rather with the supervising circuit arrangement, namely, with an ambiguity tester. The functions of the circuit which is to be supervised are accordingly of interest only insofar as they affect functions of the ambiguity tester.

The tubes V1 . . . V4 belonging to the circuit which is to be supervised may be conductive or at cut-off. Their operating condition depends upon control signals which are conducted to the grids thereof. According to the operating conditions of the tubes, there will be at the sources Q1 . . . Q4 either ground potential as a normal potential, or positive potential as a working potential. If the tubes are at cut-off or non-conducting, the ground potential will over their cathode resistors become operative at these sources. Positive potential will be at the sources when the tubes are conductive, since the potential +U can over the relays and the tubes become operative at the sources Q1 . . . Q4.

If it is now assumed, for example, that the two sources Q2 and Q3 have positive potential as working potential, the tubes V2 and V3 will be conductive and, accordingly, the relays M2 and M3 will be energized and their normally closed contacts *m*2 and *m*3 consequently will be open. The appearance of working potential at a source, excepting the first and last source of the series, has two effects, namely, activation of an input of a coincidence circuit and opening of a normal contact. Only one of these effects appears in the cast of the first and the last source, namely, in the case of the first source, opening of the respectively associated normal contact and, in the case of the last source, activation of an input of the respectively associated coincidence circuit.

When it is now assumed that the source Q2 has positive potential, such potential will be at one terminal of the resistor R1. Contact *m*2 is at the same time open. Contact *m*1 is however closed, and the positive potential of the source Q2 can not become operative at the indicating point A1 since such indicating point is over the rectifier G1 and contact *m*1 at ground potential. The rectifier G1 is conductive and its resistance is considerably lower than that of the resistor R1.

When it is assumed that the source Q3 has positive potential, the contact *m*3 will be open and positive potential is over the resistor R2 conducted to the indicating point A2. Since contact *m*2 is open, the ground potential can not become operative at the indicating point A2 and, as already mentioned before, positive potential will at such point appear as indicating potential.

In the event that the two sources having positive potential are not disposed directly adjacently, positive potential would appear as indicating potential at the indicating point associated with the respectively successively disposed source. Similar operations take place if more than two sources have positive potential and several indicating points will accordingly have indicating potential. As already pointed out with reference to source Q2, no indicating potential will appear at any indicating point if there is positive potential on one source only. The opening of a normal contact is, due to the structure of the circuit, operatively effective only with respect to the indicating points which are in the series successively disposed and the sources of which have positive potential.

Figure 6:
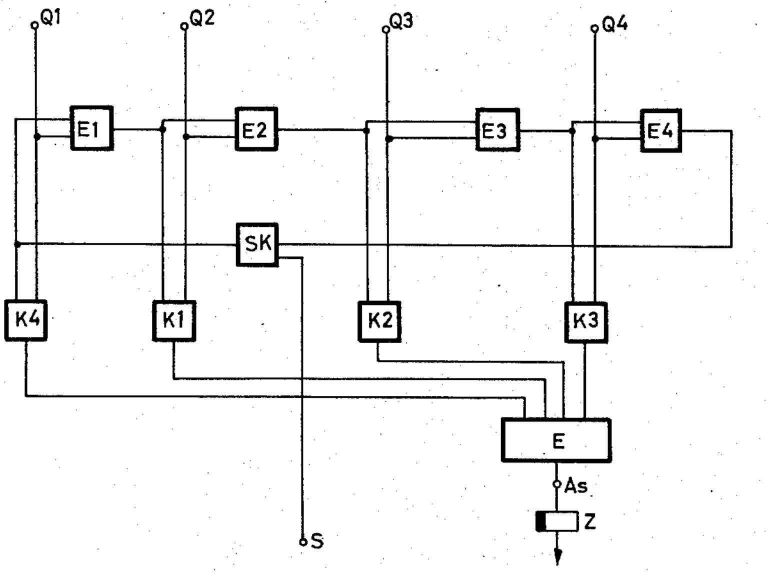
FIG. 6 illustrates a coincidence circuit for control purposes.

If there are a great number of potential sources to be supervised, they may be arranged in several groups, and an ambiguity tester, such as shown in FIG. 4, may be provided for each group. Particular measures must be taken for ascertaining ambiguities concerning all sources, that is, if the sources delivering working potential are disposed in different groups. For this purpose, the ends of the series circuits of the break contacts, which are not supplied with fixed normal potential, are connected in pairs, in all different combinations, to special two-place coincidence circuits with fixed auxiliary voltage, and the outputs thereof are conducted over decoupling rectifiers to an indicating point or terminal which is common to all ambiguity testers. FIG. 6 shows a network constructed according to this requirement, to which are connected four ambiguity testers.

Referring to FIG. 5, the corresponding end points of the series circuits of the break contacts are represented at P1 to P4, each such point corresponding to the point or terminal P in FIG. 5. Interconnection of the ambiguity testers in this manner requires presence of the last break contacts in the respective series circuits. For the sake of simplicity, it shall first be assume that there are two ambiguity testers with the termnial or end points P1 and P2 and the common indicating points A*s*1 and A*s*2. There will be in such case only one combination pair between the termnial points and, accordingly, only one coincidence circuit will be required. This coincidence circuit is contained in FIG. 6, comprising the rectifier G12, connected to the terminal point P1 and the rectifier G21, connected to the terminal point P2, both such rectifiers being connected to a common point to which is connected the resistor R12 which is supplied by the auxiliary voltage +U. The common connecting point is extended to the common indicating point A*s* by way of the decoupling rectifier E12.

In case no source delivers working potential in one or both ambiguity testers, the connecting point of rectifiers G12 and G21 will be on normal potential by way of the break contact chain and the auxiliary voltage +U accordingly can not become effective as an indicating potential. However, if one source in each of the two ambiguity testers delivers working potential, the contact chain will be interrupted by the corresponding opened break contact. In such a case, the voltage +U on the resistor R12 produces an indicating potential at the connecting point and at the common indicating point A*s*. The points A*s*1 and A*s*2 of the two ambiguity testers are suitably also connected to the point A*s*, so as to produce only one indicating point. The mutual matching of the potentials produced at the common indicating point or terminal is effected by a suitable value of the resistor R12.

If there are provided more than two ambiguity testers, in the assumed case, four testers, the entire network according to FIG. 6 will be required. The four terminal points of the series circuits will be connected to the respective points P1 to P4 of the network. In the illustrated network, two-place coincidence circuits are connected to all pairs of combinations of these terminal points. Thus, there are, for example, between the terminal point P1 and the remaining terminal points, the combinations P1—P2, P1—P3, P1—P4, the corresponding coincidence circuits comprising the switching elements G12, G21, R12; G13, G31, R13; and G14, G41, R14. The outputs extend over the decoupling rectifiers E12, E13 and E14 to the common indicating point As. The remaining coincidence circuits are constructed similarly. The indicating points or terminals As1 to As4 of all ambiguity testers are likewise connected with the indicating point or termnial As.

The use of the ambiguity testers so far described may be extended. In addition to the ambiguity testing, there is also a testing known as completeness testing, meaning, a testing for the purpose of ascertaining whether there is a relay or an equivalent switching element actually in operated position. If such is the case, completeness is established; otherwise, there is incompleteness. It is now possible, to employ one of the ambiguity testers according to the invention, as a completeness tester, by forming, by temporary connection of the *n*th switching element with the 1st switching element a feedback loop circuit and at the same time connecting a two-place coincidence circuit to the connecting point and to the potential source Q1. There will then be exactly as many coincidence circuits as there are switching elements of the series circuit and as there are sources. So long as the loop circuit is closed, the tester will deliever indicating potential if only one of the sources delivers indicating potential, because, due to the feedback loop, the working potential will always activate one input of all coincidence circuits, since the potential effects all switching elements in the manner already described. Accordingly, one input of the coincidence circuit belonging to the source delivering the working potential, will be activated, the other input will be activated by the source itself, and the corresponding coincidence circuit will accordingly deliver indicating potential. The ambiguity tester, when connected in closed feedback loop circuit, will accordingly function as a completeness tester.

The tester can, therefore, function according to such purpose, by selective closing and opening of the loop circuit. This closing and opening may be effected by a suitable switch or, as shown in FIG. 6, by a control coincidence circuit SK provided with two inputs and one output.

In the tester illustrated in FIG. 6, mixing gates E1 to E4 are used as switching elements of the series. Other equivalent switching elements may, of course, be used. The output of the control coincidence circuit SK is connected to the first switching element, the mixing gate E1, while one input is connected to the last switching element, the mixing gate E4, the other input being connected to receive a control voltage from the terminal S, such control voltage effecting transmission of the working potential from the mixing gate E4 to the mixing gate E1. The testing or supervising of the equipment part comprising the sources Q1 to Q4 is effected with this circuit as follows:

In the operating condition of the corresponding equipment part, the feedback loop circuit is closed by a control voltage conducted to the control coincidence circuit. In case of completeness, obtaining in the equipment part under supervision, there will appear an indicating potential at the output As of the mixing gate E. Assuming proper operation of the corresponding equipment part and of the ambiguity tester, such potential must appear. Accordingly, the operation of the ambiguity tester is at the same time also supervised. The indicating potential disappears upon removal of the control voltage from the control coincidence circuit. However, the control potential will persist if there is a condition of ambiguity in the supervised equipment part. It is therefore possible to connect an indicating device to the indicating point As, which energizes with a delay and, accordingly, only in the case of ambiguity, such indicating device being shown in FIG. 6 at Z.

FIG. 7 shows an embodiment of an ambiguity tester connected in feedback loop circuit. The switching elements are represented by mixing gates. The ambiguity tester is provided for supervision of three sources Q1 to Q3. There are, accordingly, three mixing gates provided, each comprising two rectifiers, namely, the rectifiers G11, G12; G21, G22; and G31, G32. Between the output of a mixing gate and the input of the next successive mixing gate is disposed an amplifier comprising two transistor stages. Thus, there are provided between the mixing gates G11, G12 and G21, G22, two transistor amplifier stages comprising transistors T11 and T12. In order to produce the feedback loop, the output electrode of the transistor stage having the transistor T32 is connected with the input of the mixing gate comprising the rectifiers G11 and G12. The closing and opening of the feedback loop is effected by the control coincidence circuit connected between the stages of an amplifier and comprising the rectifiers G35 and G36. There are, in addition, three two-place coincidence circuits with fixed auxiliary voltage, which are connected, as already described, each to a source and to the output electrode of the respective preceding amplifier stage, the outputs of these coincidence circuits operating with respect to a mixing gate comprising three rectifiers G01, G02 and G03 and if desired, delivering the indicating potential at the indicating point or terminal As.

In this example, the sources Q1 and Q3 deliver negative working potential, ground representing the normal potential. The rectifiers and the mixing gates of the coincidence circuits are correspondingly polarized. The transistors of the amplifier stages are n-p-n transistors in emitter circuit. The emitters have low positive bias +Uv and the collectors are connected to negative feed voltage over resistors R13, R16, R23, R26, R33 and R36, respectively. In normal condition of the circuit, that is, when no working potential is delivered by any of the sources, there will be ground potential at the bases of the transistors T11, T21 and T31. These transistors are the first of the two transistors of each amplifier. The potential, for example, on the base of the transistor T11 is produced by means of a voltage divider R12—R11. One end or terminal of this voltage divider is directly on ground and the other on the source Q1 by way of the rectifier G12, the normal or resting potential of such source being equal to ground, and over rectifier G11 on the output electrode of the transistor T32, such output electrode, as will be presently explained, being in this condition of the circuit likewise on ground. The positive bias +Uv of the emitter of the transistor T11 shall be so low that the transistor is in the corresponding condition blocked. Accordingly, no emitter-collector current flows over the working resistor R13. To this working resistor is connected one terminal of the voltage divider R14—R15 serving for the determination of the base potential of the transistor T12, while the other terminal is connected to ground. No transistor current flows over the resistor R13 that might cause a voltage drop. The negative potential −U is, accordingly, effective with respect to the voltage divider R14—R15, so that the base potential of the transistor T12 is made negative. The transistor T12 is accordingly in conductive condition. At its working resistor R16 occurs a great voltage drop, transistor current flowing through such resistor, and the collector of transistor T12 will therefore be about at ground potential, such condition being caused by suitable dimensioning of the positive bias +Uv. The transistor T32 is in the corresponding stage of an amplifier disposed similarly as transistor T12, and is due to the symmetry of the circuit in the same operating condition, provided that the control coincidence circuit G35, G36 does not interrupt the feedback loop. Its collector is, accordingly, also at ground potential. It will be seen, therefore, that the above stated condition concerning the potential at the output electrode of transistor T32 is fully satisfied. Accordingly, the transistors T11, T21, T31 are normally blocked and the transistors T12, T22 and T32 are conductive.

Upon appearance of a negative potential at the input of a mixing gate, for example, the mixing gate comprising the rectifiers G11, G12, negative potential will also effect one end or terminal of the voltage divider R11—R12 and the base potential of the transistor T11 will become negative, making such transistor conductive. The collector of such transistor accordingly assumes ground potential and the transistor T12 will be blocked, its collector potential becoming negative, thus causing the transistors of the succeeding amplifiers in the series to change their operating conditions, provided that the feedback loop is not interrupted by the control coincidence circuit G35, G36.

In order to cause switching through of the feedback loop circuit, ground potential will be connected to the control terminal S. Upon subsequent appearance of negative potential at the collector of the transistor T31, the rectifier G35 will pass current and the rectifier G36 will block passage of current. The negative collector potential can, therefore, become effective with respect to the succeeding amplifier transistor stage. When the collector assumes ground potential, such potential will be on the rectifiers G35 and G36 and can become operatively effective. The feedback loop circuit is thus cut through.

However, if sufficiently negative potential is connected to the control terminal S, for the purpose of interruption of the feedback loop, the voltage divider will be affected by such negative potential, such potential persisting even responsive to delivery of working potential by the source Q3, which is negative potential, causing transistor T31 to become conductive and its collector assuming ground potential. The rectifier G35 will in such case block passage of current while the rectifier G36 will pass current. The ground potential at the collector cannot become effective for the determination of the operating condition of the suceeding transistor T32. The feedback loop circuit is, accordingly, interrupted.

The operations incident to a completeness test and incident to an ambiguity test will now be reviewed in order to aid further in the understanding of the entire function of the system and circuit.

The feedback loop circuit must be connected through for effecting a completeness test. The control terminal is, accordingly, put on ground potential. Assuming now that working potential is delivered at the source Q2, the transistor T21 will become conductive by way of the rectifier G22 and the voltage divided R21—R22, and the transistor T22 will be blocked, negative potential appearing at its collector, and the transistor T31 connected thereto will become conductive while the transistor T32 will be at cutoff. The transistor T11 is consequently made conductive, over the feedback line, and the transistor T12 is blocked, its collector becoming negative. To such collector and to the source Q1 is, however, connected the two-place coincidence circuit comprising the rectifiers G13 and G14 and the resistor R17. The fixed negative auxiliary potential —U, extended over the resistor R17 will in this condition not effect the source Q2 and the collector can, therefore, become effective with respect to the indicating point A*s*, over the rectifier G02 of the output gate, so as to indicate completeness.

In case of an ambiguity test, the feedback circuit must be open. At the control terminal S will be negative potential. It shall be assumed that sources Q2 and Q3 deliver working potential. The transistor T21 is now made conductive by the source Q2, by way of rectifier G22 and voltage divider R21—R22, and the transistor T22 will be at cutoff, its collector becoming negative. The rectifier G23 of the two-place coincidence circuit G23, G24, R27 will not dissipate the negative auxiliary potential extended over resistor R27. Since the source Q3 which is connected to the other rectifier, namely, rectifier G24 of the same coincidence circuit, is likewise negative, the auxiliary potential can become effective and reaches the indicating terminal A*s* by way of the rectifier G03 so as to indicate ambiguity.

The completeness test may be carried out in a manner differing from the one described so far by utilizing the output electrode AV shown in FIG. 2*a* in connection with the switching element S4. This output electrode takes the place of the individual taps of the series circuit. An activating potential appears at a certain tap of the series circuit at the instant when working potential is delivered by a given potential source Q which is allotted to a switching element disposed in the series ahead thereof. Corresponding considerations apply to the output electrode AV. Accordingly, an activating potential will appear at such output electrode responsive to working potential appearing at a given source, such potential indicating completeness of the tested circuit.

The provision, in connection with the *n*th (the last) switching element of the series circuit, of an output electrode, for indicating completeness, may of course, be utilized in all circuits for ambiguity testers as described herein, since such testers are constructed according to the same principles as applied in FIG. 2*a*. For example, an output electrode AV is also provided in FIG. 2*b* in connection with the switching element E4.

Changes may be made within the scope and spirit of the appended claims in which is defined what is believed to be new and desired to have protected by Letters Patent.

I claim:

1. Circuit ambiguity testing apparatus for signalling the simultaneous presence of a predetermined switching potential at more than one of a plurality of functionally related potential sources, comprising means forming a plurality of coincidence circuits, the output of each coincidence circuit forming an indicating point, means for directly connecting one input of each coincidence circuit to one of said potential sources, a plurality of structurally identical switching elements connected in a series circuit, means for connecting the other input of each coincidence circuit with a tap of said series circuit, each of said switching elements cooperatively related to one of said potential sources, each switching element being operatively responsive to appearance of a predetermined potential on the potential source cooperatively related thereto for causing activation of the inputs of the coincidence circuits disposed successively in the series circuit and having an input thereof connected with other potential sources for the purpose of producing an indicating potential at an indicating point belonging to a directly connected potential source at which said predetermined potential is present.

2. Apparatus according to claim 1, comprising an output mixing gate, and means for connecting the outputs of said coincidence circuits with said mixing gate, said indicating potential appearing at the output of said mixing gate.

3. Apparatus according to claim 1, comprising amplifier means respectively disposed between said serially related switching means.

4. Apparatus according to claim 3, comprising transistor amplifier stages connected in chain circuit constituting said amplifier means.

5. Apparatus according to claim 3, wherein each coincidence circuit comprises two rectifiers and one resistor connected to an auxiliary potential.

6. Apparatus according to claim 1, wherein each switching element comprises a mixing gate with two inputs, one of said inputs being connected with one of said potential sources and the other input being connected with the output of the preceding mixing gate.

7. Apparatus according to claim 1, wherein each switching element comprises a rectifier, said potential sources being each connected to a tap of said series circuit by way of a decoupling rectifier adapted to pass working potential therefrom, said decoupling rectifier preceding in the series the potential source directly connected with a coincidence circuit having an input connected to the same tap, said rectifiers of said series circuit being poled so as to permit propagation of working potentials delivered only in the direction toward the end of said series circuit.

8. Apparatus according to claim 1, comprising break contacts respectively allotted to said potential sources and constituting said serially related switching elements, means responsive to delivery of working potential at the corresponding potential sources for opening the respective break contacts, said taps being disposed between said contacts, said other inputs of said coincidence circuits being respectively connected to those of the taps which precede the break contacts allotted to the respective potential sources, the first break contact in said series circuit being connected to a fixed potential.

9. Apparatus according to claim 8, including a plurality of said ambiguity testing devices, comprising circuit means for determining ambiguity of all potential sources, coincidence circuits operating with fixed auxiliary potential, said circuit means comprising means for connecting the last of said break contacts in pairs of combinations with said coincidence circuits, means forming an indicating terminal common to all ambiguity testing devices, and decoupling rectifier means for connecting the outputs of said coincidence circuits with said terminal.

10. Apparatus according to claim 1, comprising control means for selectively temporarily interconnecting the last and first switching element in the series, and a coincidence circuit connected respectively with said control means and with the first one of said potential sources.

11. Apparatus according to claim 10, comprising means for connecting the switching element first in said series with the output of a coincidence control circuit provided with two inputs, means for connecting the last one of said switching element with one of said inputs, and means for connecting a switching potential to the second one of said inputs.

12. Apparatus according to claim 10, comprising a two-stage transistor circuit, and means for connecting said coincidence control circuit being connected between the output of one and the input of the other stage.

13. Apparatus according to claim 12, comprising an indicating device adapted to operate with a delay, and means for utilizing the indicating potential at the output of a mixing gate for initiating the operation of said indicating device.

14. Apparatus according to claim 1, adapted for additional use as a circuit completeness tester, comprising an output electrode connected with the last of said switching elements in the series, said output electrode corresponding to the individual taps in the series, means for connecting activating potential to said output electrode, and means controlled by such potential for effecting indication of circuit completeness.

References Cited in the file of this patent

UNITED STATES PATENTS

| | | |
|---|---|---|
| 2,776,405 | Moore | Jan. 1, 1957 |
| 2,885,146 | Speh | May 5, 1959 |